(12) United States Patent (10) Patent No.: US 9,002,635 B2
Trum (45) Date of Patent: Apr. 7, 2015

(54) NAVIGATION APPARATUS USED-IN VEHICLE

(75) Inventor: Jeroen Trum, Eindhoven (NL)

(73) Assignee: TomTom International B.V., Amsterdam (NL)

( * ) Notice: Subject to any disclaimer, the term of this patent is extended or adjusted under 35 U.S.C. 154(b) by 609 days.

(21) Appl. No.: 12/736,860

(22) PCT Filed: Jan. 14, 2009

(86) PCT No.: PCT/EP2009/050370
§ 371 (c)(1),
(2), (4) Date: Dec. 20, 2010

(87) PCT Pub. No.: WO2010/081540
PCT Pub. Date: Jul. 22, 2010

(65) Prior Publication Data
US 2011/0087429 A1 Apr. 14, 2011

(51) Int. Cl.
*G01C 21/34* (2006.01)
*G01C 21/36* (2006.01)
*G08G 1/0967* (2006.01)
*G01C 21/32* (2006.01)
G08G 1/0968 (2006.01)

(52) U.S. Cl.
CPC ...... *G01C 21/3484* (2013.01); *G08G 1/096888* (2013.01); *G01C 21/3697* (2013.01); *G08G 1/0967* (2013.01); *G01C 21/3617* (2013.01); *G08G 1/096838* (2013.01); *G01C 21/32* (2013.01)

(58) Field of Classification Search
CPC ............ G08G 1/096888; G08G 1/096838; G08G 1/0967; G01C 21/3461; G01C 21/3484; G01C 21/3697; G01C 21/3617

USPC ......... 701/422–425, 430, 435, 439, 457, 462, 701/482, 521, 540; 340/995.28
See application file for complete search history.

(56) References Cited

U.S. PATENT DOCUMENTS

| 5,948,042 | A | | 9/1999 | Heiman et al. | |
|---|---|---|---|---|---|
| 5,991,689 | A | * | 11/1999 | Aito et al. | 701/416 |
| 6,256,579 | B1 | * | 7/2001 | Tanimoto | 701/533 |
| 2004/0039504 | A1 | * | 2/2004 | Coffee et al. | 701/35 |
| 2006/0069501 | A1 | * | 3/2006 | Jung et al. | 701/209 |

(Continued)

FOREIGN PATENT DOCUMENTS

| EP | 0752692 A1 | 1/1997 |
|---|---|---|
| EP | 1 045 224 A2 | 10/2000 |

(Continued)

OTHER PUBLICATIONS

International Search Report.

*Primary Examiner* — Jason Holloway

(57) ABSTRACT

A technique is disclosed for enabling collection and/or refinement of digital map information for aiding navigation route planning for vehicles larger than ordinary cars, such as goods-vehicles, buses, and car+caravan combinations. In at least one embodiment, a profile of a vehicle's characteristics, and one or more routes followed, are logged by a navigation device, and fed-back to a server that supports the navigation device with map data updates. At the server, or an alternative processing centre, the fed-back data from plural navigation devices is analysed to observe statistically the patterns of roads used by these vehicles, and to categorise these by the type of vehicle.

11 Claims, 10 Drawing Sheets

(56) References Cited

U.S. PATENT DOCUMENTS

| | | |
|---|---|---|
| 2006/0122846 A1* | 6/2006 | Burr et al. .......................... 705/1 |
| 2006/0265124 A1* | 11/2006 | Ohler ............................ 701/209 |
| 2007/0038367 A1* | 2/2007 | Froeberg ....................... 701/202 |
| 2007/0225900 A1 | 9/2007 | Kropp |
| 2009/0005965 A1* | 1/2009 | Forstall et al. ................ 701/201 |
| 2009/0171573 A1* | 7/2009 | Chang ........................... 701/209 |
| 2010/0121514 A1* | 5/2010 | Kato et al. ...................... 701/22 |
| 2011/0029230 A1* | 2/2011 | Kimura ......................... 701/201 |
| 2011/0172903 A1* | 7/2011 | Farr .............................. 701/201 |
| 2011/0246004 A1* | 10/2011 | Mineta ........................... 701/22 |
| 2012/0290202 A1* | 11/2012 | Gueziec ........................ 701/423 |

FOREIGN PATENT DOCUMENTS

| | | |
|---|---|---|
| EP | 1 832 843 A1 | 9/2007 |
| EP | 1 532 600 B1 | 3/2008 |
| JP | 2005292024 A | 10/2005 |
| JP | 2007058370 A | 3/2007 |
| JP | 2007285955 A | 11/2007 |

\* cited by examiner

NAVIGATION APPARATUS USED-IN VEHICLE

FIELD OF THE INVENTION

The present invention relates to the field of navigation devices for in-vehicle use, and methods associated therewith. Such devices may, for example, be installed as integral vehicle equipment, or may be portable devices configured or configurable for in-vehicle use. The invention may be implemented at least partly within a navigation device and/or at least partly with other equipment with which the navigation device communicates.

BACKGROUND TO THE INVENTION

Portable navigation devices (PNDs) that include GPS (Global Positioning System) signal reception and processing functionality are well known and are widely employed as in-car or other vehicle navigation systems.

In general terms, modern PNDs comprise a processor, memory (at least one of volatile and non-volatile, and commonly both), and map data stored within said memory. The processor and memory cooperate to provide an execution environment in which a software operating system may be established, and additionally it is commonplace for one or more additional software programs to be provided to enable the functionality of the PND to be controlled, and to provide various other functions.

Typically these devices further comprise one or more input interfaces that allow a user to interact with and control the device, and one or more output interfaces by means of which information may be relayed to the user. Illustrative examples of output interfaces include a visual display and a speaker for audible output. Illustrative examples of input interfaces include one or more physical buttons to control on/off operation or other features of the device (which buttons need not necessarily be on the device itself but could be on a steering wheel if the device is built into a vehicle), and a microphone for detecting user speech. In a particularly preferred arrangement the output interface display may be configured as a touch sensitive display (by means of a touch sensitive overlay or otherwise) to additionally provide an input interface by means of which a user can operate the device by touch.

Devices of this type will also often include one or more physical connector interfaces by means of which power and optionally data signals can be transmitted to and received from the device, and optionally one or more wireless transmitters/receivers to allow communication over cellular telecommunications and other signal and data networks, for example Wi-Fi, Wi-Max GSM and the like.

PND devices of this type also include a GPS antenna by means of which satellite-broadcast signals, including location data, can be received and subsequently processed to determine a current location of the device.

The PND device may also include electronic gyroscopes and accelerometers which produce signals that can be processed to determine the current angular and linear acceleration, and in turn, and in conjunction with location information derived from the GPS signal, velocity and relative displacement of the device and thus the vehicle in which it is mounted. Typically such features are most commonly provided in in-vehicle navigation systems, but may also be provided in PND devices if it is expedient to do so.

The utility of such PNDs is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths) or other points of interest), and favourite or recently visited destinations.

Typically, the PND is enabled by software for computing a "best" or "optimum" route between the start and destination address locations from the map data. A "best" or "optimum" route is determined on the basis of predetermined criteria and need not necessarily be the fastest or shortest route. The selection of the route along which to guide the driver can be very sophisticated, and the selected route may take into account existing, predicted and dynamically and/or wirelessly received traffic and road information, historical information about road speeds, and the driver's own preferences for the factors determining road choice (for example the driver may specify that the route should not include motorways or toll roads). The PND may record trip information so that the actual journey time may be recorded and fed back for more accurate prediction of how journey times vary at different times of day in accordance with habitual weight of traffic flow.

In addition, the device may continually monitor road and traffic conditions, and offer to or choose to change the route over which the remainder of the journey is to be made due to changed conditions. Real time traffic monitoring systems, based on various technologies (e.g. mobile phone data exchanges, fixed cameras, GPS fleet tracking) are being used to identify traffic delays and to feed the information into notification systems.

PNDs of this type may typically be mounted on the dashboard or windscreen of a vehicle, but may also be formed as part of an on-board computer of the vehicle radio or indeed as part of the control system of the vehicle itself. The navigation device may also be part of a hand-held system, such as a PDA (Portable Digital Assistant) a media player, a mobile phone or the like, and in these cases, the normal functionality of the hand-held system is extended by means of the installation of software on the device to perform both route calculation and navigation along a calculated route.

Route planning and navigation functionality may also be provided by a desktop or mobile computing resource running appropriate software. For example, the Royal Automobile Club (RAC) provides an on-line route planning and navigation facility which allows a user to enter a start point and a destination whereupon the server to which the user's PC is connected calculates a route (aspects of which may be user specified), generates a map, and generates a set of exhaustive navigation instructions for guiding the user from the selected start point to the selected destination. The facility also provides for pseudo three-dimensional rendering of a calculated route, and route preview functionality which simulates a user travelling along the route and thereby provides the user with a preview of the calculated route.

In the context of a PND, once a route has been calculated, the user interacts with the navigation device to select the desired calculated route, optionally from a list of proposed routes. Optionally, the user may intervene in, or guide the route selection process, for example by specifying that certain routes, roads, locations or criteria are to be avoided or are mandatory for a particular journey. The route calculation aspect of the PND forms one primary function, and navigation along such a route is another primary function.

During navigation along a calculated route, it is usual for such PNDs to provide visual and/or audible instructions to guide the user along a chosen route to the end of that route, i.e. the desired destination. It is also usual for PNDs to display map information on-screen during the navigation, such information regularly being updated on-screen so that the map information displayed is representative of the current location of the device, and thus of the user or user's vehicle if the device is being used for in-vehicle navigation.

An icon displayed on-screen typically denotes the current device location, and is centred with the map information of current and surrounding roads in the vicinity of the current device location and other map features also being displayed. Additionally, navigation information may be displayed, optionally in a status bar above, below or to one side of the displayed map information, examples of navigation information include a distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated a simple instruction such as "turn left in 100 m" requires significant processing and analysis. As previously mentioned, user interaction with the device may be by a touch screen, or additionally or alternately by steering column mounted remote control, by voice activation or by any other suitable method.

A further important function provided by the device is automatic route re-calculation in the event that: a user deviates from the previously calculated route during navigation (either by accident or intentionally); real-time traffic conditions dictate that an alternative route would be more expedient and the device is suitably enabled to recognize such conditions automatically, or if a user actively causes the device to perform route re-calculation for any reason.

It is also known to allow a route to be calculated with user defined criteria; for example, the user may prefer a scenic route to be calculated by the device, or may wish to avoid any roads on which traffic congestion is likely, expected or currently prevailing. The device software would then calculate various routes and weigh more favourably those that include along their route the highest number of points of interest (known as POIs) tagged as being for example of scenic beauty, or, using stored information indicative of prevailing traffic conditions on particular roads, order the calculated routes in terms of a level of likely congestion or delay on account thereof. Other POI-based and traffic information-based route calculation and navigation criteria are also possible.

Although the route calculation and navigation functions are fundamental to the overall utility of PNDs, it is possible to use the device purely for information display, or "free-driving", in which only map information relevant to the current device location is displayed, and in which no route has been calculated and no navigation is currently being performed by the device. Such a mode of operation is often applicable when the user already knows the route along which it is desired to travel and does not require navigation assistance.

Devices of the type described above, for example the 720T model manufactured and supplied by TomTom International B.V., provide a reliable means for enabling users to navigate from one position to another.

As mentioned above, the memory of the PND stores map data used by the PND not only to calculate routes and provide necessary navigation instructions to users, but also to provide visual information to users through the visual display of the PND.

As is known in the art, map information can be expressed in a number of ways and indeed can comprise a number of separate information components, which are used in combination by the PND. One aspect of map information is supplementary road information to provide information additional to the mere location of the road. Supplementary road information may include information about the suitability of a road for, for example, a goods-vehicle. While most roads are suitable for cars, special criteria may apply to goods-vehicles depending on their size or other criteria (for example, limits on height, weight, width; restrictions on hazardous materials; and special speed limits). As an alternative to imposing limits and restrictions, some roads may be designated as goods-vehicle-friendly or goods-vehicle-preferred, i.e. roads indicated expressly as suitable for goods-vehicles.

Map suppliers expend a lot of effort and expense in trying to ensure that goods-vehicle-specific information for a map is both comprehensive and complete. This is because goods-vehicle-specific information is not useful unless the information is reliable and complete for all areas covered by the map. For example, in order for a high goods-vehicle to pass along a calculated navigation route, any height restrictions have to be 100% correct along the entire route. It only takes one height-restricted bridge, incorrectly recorded in, or missing from, the map information to risk the goods-vehicle becoming stuck or risking collision damage to the goods-vehicle or bridge. Reliable route-planning relies on accurate goods-vehicle-specific information in the area along the entire route.

In general, there are two methods for obtaining map information, including goods-vehicle-specific information. The first is to purchase the information from government authorities and original mapping companies. However, the completeness, quality and current validity of such information may not be guaranteed, and differs from country to country. The second is to drive a vehicle equipped with special mapping equipment around the road network to collect the information using the mapping equipment. For example, the image footage from cameras mounted on the vehicle can be analysed to identify road signs depicting goods-vehicle restrictions. However, such a process is time-consuming and laborious. The task is magnified when trying to prepare accurate maps covering several countries. Moreover, the technique is limited to goods-vehicle-specific information that is signed by road signs.

There is a further aspect of goods-vehicle-specific information that is currently impossible to collect by the above mapping techniques. This is the personal knowledge or personal route preferences of experienced goods-vehicle drivers. Experienced goods-vehicle drivers build up a personal knowledge base of which routes are suitable, or they personally prefer, for their goods-vehicles (either from personal experience or from talking to other goods-vehicle drivers). For example, goods-vehicle drivers often prefer avoiding certain routes because certain turns, junctions or villages are difficult to negotiate, even though there are no formal restrictions in place preventing a goods-vehicle from using the route, or making a certain turn, or passing through the centre of a small village. Occasionally, an inexperienced goods-vehicle driver using a navigation device may cause congestion nuisance, or even building damage, by following a navigation route that is perfectly legal for the goods-vehicle, but that a driver with local knowledge would prefer not to follow. When such nuisance occurs, it can result in negative publicity. Arguably, a navigation device is intended to be at its most useful for navigating unfamiliar roads. The reaction of inconvenienced members of the public may be to criticise the use of navigation devices in general, and the embarrassed goods-vehicle driver may place less trust in a navigation device's guidance.

The present invention has been devised bearing the above issues in mind.

SUMMARY OF THE INVENTION

Aspects of the present invention are defined in the claims.

Broadly speaking, one aspect of the present invention provides a technique for enabling collection and/or refinement of supplementary road information for vehicles larger than ordinary cars, such as goods-vehicles, buses, and car+caravan combinations. A profile of a vehicle's characteristics, and one or more routes followed, are logged by a navigation device, and fed-back to a server that supports the navigation device with map data updates. At the server, or an alternative processing centre, the fed-back data from plural navigation devices is analysed to observe statistically the patterns of roads used by these vehicles, and to categorise such information by the type of vehicle.

For example, roads commonly used by vehicles such as goods-vehicles can be identified and designated as "goods-vehicle-common", even though there may be no official designation of such roads as being expressly suitable for goods-vehicles. Such information represents expert knowledge of goods-vehicle drivers who habitually use the road, and is extremely valuable information for planning a route for a goods-vehicle driver with less local experience of knowledge. In a similar manner, a statistical determination can also be made of which roads (or junctions, turns, or village centres of other built up areas) are habitually avoided by goods-vehicles. Avoidance may be particularly significant if the goods-vehicle driver deviates from a route planned by a navigation system. Where such deviation or avoidance emerges as a trend, the particular road (or junction, etc.) may be designated as "goods-vehicle-wary". Such information again represents expert knowledge of goods-vehicle drivers who habitually drive in the area, and is extremely valuable information for planning a route for a goods-vehicle driver with less local knowledge or experience.

The supplementary road information in the digital map is updated based on the above types of statistical analysis by vehicle type, and updated digital map data is subsequently downloaded to individual navigation devices and/or navigation processing centres (such as servers hosting online route planning functionality). Route-planning by the navigation devices and/or centres can therefore take account of such expert knowledge, to reduce the risk of a goods-vehicle being guided along a route that an experienced goods-vehicle driver would choose not to follow.

Additionally or alternatively, journey time for a route or route segment may also be analysed according to vehicle category. Such information may be used to provide an estimated journey time suited for a particular vehicle category, such as a goods vehicle.

The invention extends to cover all aspects of implementation, including but not limited to, methods, apparatus, map formats, computer programs, and record carriers carrying a computer program or map format.

BRIEF DESCRIPTION OF THE DRAWINGS

Various aspects of the teachings of the present invention, and arrangements embodying those teachings, will hereafter be described by way of illustrative example with reference to the accompanying drawings, in which.

DETAILED DESCRIPTION OF PREFERRED EMBODIMENTS

Figure 1:
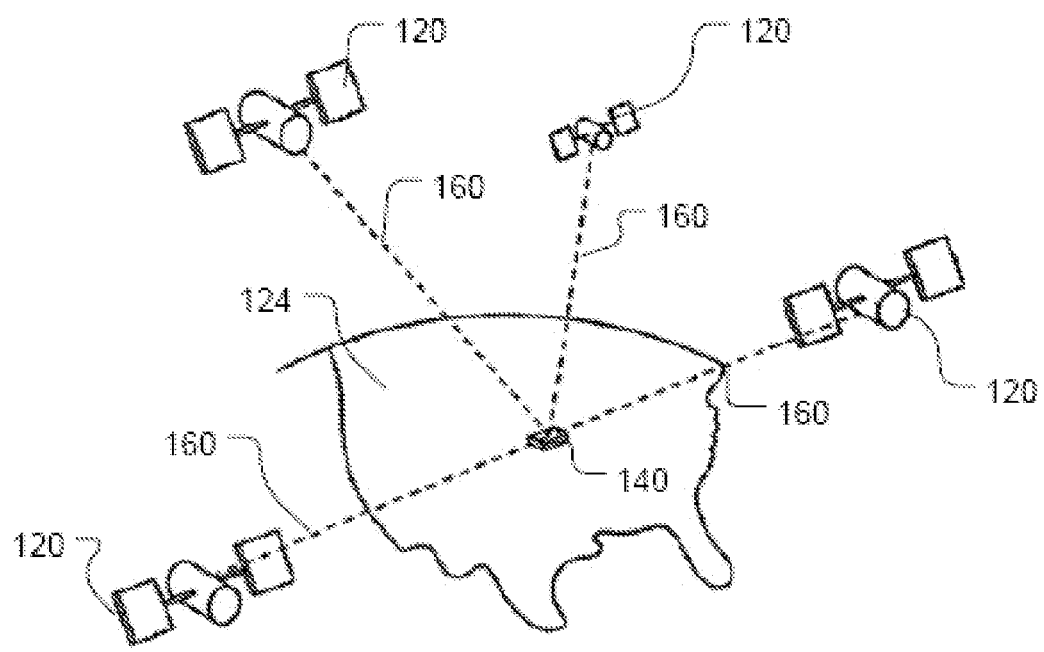
FIG. 1 is a schematic illustration of a Global Positioning System (GPS)

Preferred embodiments of the present invention will now be described with particular reference to a PND. It should be remembered, however, that the teachings of the present invention are not limited to PNDs but are instead universally applicable to any type of processing device that is configured to execute navigation software so as to provide route planning and navigation functionality. It follows therefore that in the context of the present application, a navigation device is intended to include (without limitation) any type of route planning and navigation device, irrespective of whether that device is embodied as a PND, a navigation device built into a vehicle, or indeed a computing resource (such as a desktop or portable personal computer (PC), mobile telephone or portable digital assistant (PDA)) executing route planning and navigation software.

It will also be apparent from the following that the teachings of the present invention even have utility in circumstances where a user is not seeking instructions on how to navigate from one point to another, but merely wishes to be provided with a view of a given location. In such circumstances the "destination" location selected by the user need not have a corresponding start location from which the user wishes to start navigating, and as a consequence references herein to the "destination" location or indeed to a "destination" view should not be interpreted to mean that the generation of a route is essential, that travelling to the "destination" must occur, or indeed that the presence of a destination requires the designation of a corresponding start location.

The preferred embodiment implements a technique for enabling continuous collection and refinement of supplementary road information for vehicles larger than ordinary cars, such as goods-vehicles, buses, and car+caravan combinations. As used herein, the term "goods-vehicle" is intended to include, but is not limited to, trucks, lorries, vans, and articulated vehicles. The invention may be focussed on a specific vehicle category or sub-category, or it may be applied to cover multiple categories. A profile of a vehicle's characteristics, and routes followed, are logged by a navigation device, and fed-back to a server that supports the navigation device with map data updates. At the server, or an alternative processing centre, the fed-back data from plural navigation devices is analysed to observe statistically the patterns of roads used by these vehicles, and to categorise these by the type of vehicle. This enables roads commonly used by vehicles such as goods-vehicles to be identified and designated as "goods-vehicle-common", even though there may be no official designation of such roads as being expressly suitable for goods-vehicles. Such information represents expert knowledge of goods-vehicle drivers who habitually use the road, and is extremely valuable information for planning a route for a goods-vehicle driver with less local experience of knowledge. In a similar manner, a statistical determination can also be made of which roads (or junctions, turns, or village centres of other built up areas) are habitually avoided by goods-vehicles. Avoidance may be particularly significant if the goods-vehicle driver deviates from a route planned by a navigation system. Where such deviation or avoidance emerges as a trend, the particular road (or junction, etc.) may be designated as "goods-vehicle-wary". Such information again represents expert knowledge of goods-vehicle drivers who habitually drive in the area, and is extremely valuable information for planning a route for a goods-vehicle driver with less local knowledge or experience. The supplementary road information in the digital map is updated based on the above types of statistical analysis by vehicle type, and updated digital map data is subsequently downloaded to individual navigation devices and/or other route planning processors. Route-planning by the navigation devices or processors can therefore take account of such expert knowledge, to reduce the risk of a goods-vehicle being guided along a route that an experienced goods-vehicle driver would choose not to follow.

Additionally or alternatively, journey time for a route or route segment may also be analysed according to vehicle category. Such information may be used to provide an estimated journey time suited for a particular vehicle category, such as a goods-vehicle.

While the preferred embodiment discusses the technique mainly applied to goods-vehicles, the same principles extend to other types of large or awkward or special-category vehicles, which may include, for example, buses and car+caravan combinations.

FIG. 1 illustrates an example view of a positioning system usable by navigation devices. The example positioning system is the Global Positioning System (GPS), which is known and used for a variety of purposes. However, many other types of positioning system (e.g. satellite and/or radio based) may be used as desired. In general, GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by the same geometrical calculation in a known manner. The position and velocity data can be updated in real time on a continuous basis by an unlimited number of users.

As shown in FIG. 1, the GPS system is denoted generally by reference numeral 100. A plurality of satellites 120 are in orbit about the earth 124. The orbit of each satellite 120 is not necessarily synchronous with the orbits of other satellites 120 and, in fact, is likely asynchronous. A GPS receiver 140 is shown receiving spread spectrum GPS satellite signals 160 from the various satellites 120.

The spread spectrum signals 160, continuously transmitted from each satellite 120, utilize a highly accurate frequency standard accomplished with an extremely accurate atomic clock. Each satellite 120, as part of its data signal transmission 160, transmits a data stream indicative of that particular satellite 120. It is appreciated by those skilled in the relevant art that the GPS receiver device 140 generally acquires spread spectrum GPS satellite signals 160 from at least three satellites 120 for the GPS receiver device 140 to calculate its two-dimensional position by triangulation. Acquisition of an additional signal, resulting in signals 160 from a total of four satellites 120, permits the GPS receiver device 140 to calculate its three-dimensional position in a known manner.

Figure 2:
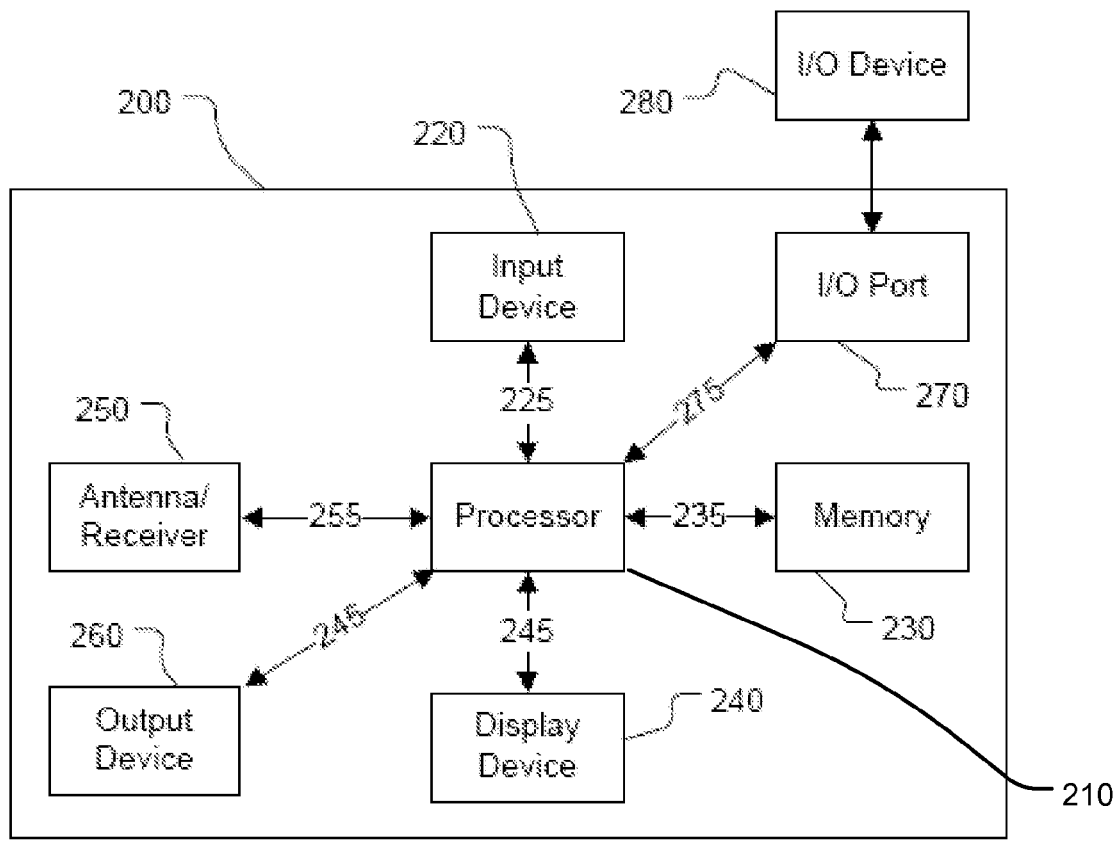
FIG. 2 is a schematic illustration of electronic components arranged to provide a navigation device.

FIG. 2 is an illustrative representation of electronic components of a navigation device 200 according to a preferred embodiment of the present invention, in block component format. It should be noted that the block diagram of the navigation device 200 is not inclusive of all components of the navigation device, but is only representative of many example components.

The navigation device 200 is located within a housing (not shown). The housing includes a processor 210 connected to an input device 220 and a display screen 240. The input device 220 can include a keyboard device, voice input device, touch panel and/or any other known input device utilised to input information; and the display screen 240 can include any type of display screen such as an LCD display, for example. In a particularly preferred arrangement the input device 220 and display screen 240 are integrated into an integrated input and display device, including a touchpad or touchscreen input so that a user need only touch a portion of the display screen 240 to select one of a plurality of display choices or to activate one of a plurality of virtual buttons.

The navigation device may include an output device 260, for example an audible output device (e.g. a loudspeaker). As output device 260 can produce audible information for a user of the navigation device 200, it is should equally be understood that input device 240 can include a microphone and software for receiving input voice commands as well.

In the navigation device 200, processor 210 is operatively connected to and set to receive input information from input device 220 via a connection 225, and operatively connected to at least one of display screen 240 and output device 260, via output connections 245, to output information thereto. Further, the processor 210 is operably coupled to a memory resource 230 via connection 235 and is further adapted to receive/send information from/to input/output (I/O) ports 270 via connection 275, wherein the I/O port 270 is connectible to an I/O device 280 external to the navigation device 200. The memory resource 230 comprises, for example, a volatile memory, such as a Random Access Memory (RAM) and a non-volatile memory, for example a digital memory, such as a flash memory. The external I/O device 280 may include, but is not limited to an external listening device such as an earpiece for example. The connection to I/O device 280 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 200 and the internet or any other network for example, and/or to establish a connection to a server via the internet or some other network for example.

FIG. 2 further illustrates an operative connection between the processor 210 and an antenna/receiver 250 via connection 255, wherein the antenna/receiver 250 can be a GPS antenna/receiver for example. It will be understood that the antenna and receiver designated by reference numeral 250 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 2 are powered by power sources (not shown) in a conventional manner. As will be understood by one of ordinary skill in the art, different configurations of the components shown in FIG. 2 are considered to be within the scope of the present application. For example, the components shown in FIG. 2 may be in communication with one another via wired and/or wireless connections and the like. Thus, the scope of the navigation device 200 of the present application includes a portable or handheld navigation device 200.

In addition, the portable or handheld navigation device 200 of FIG. 2 can be connected or "docked" in a known manner to a vehicle such as a bicycle, a motorbike, a car or a boat for example. Such a navigation device 200 is then removable from the docked location for portable or handheld navigation use.

Figure 3:
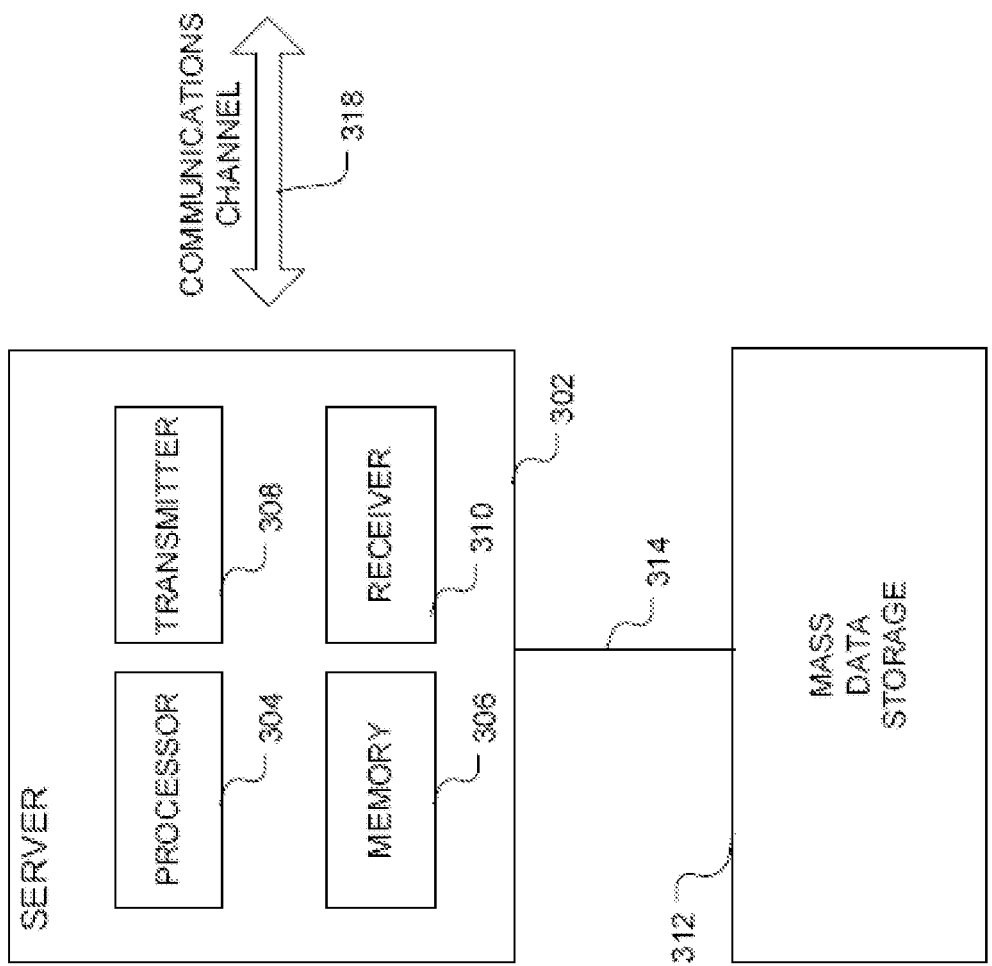
FIG. 3 is a schematic illustration of the manner in which a navigation device may receive information over a wireless communication channel.

Referring now to FIG. 3, the navigation device 200 may establish a "mobile" or telecommunications network connection with a server 302 via a mobile device (not shown) (such as a mobile phone, PDA, and/or any device with mobile phone technology) establishing a digital connection (such as a digital connection via known Bluetooth technology for example). Thereafter, through its network service provider, the mobile device can establish a network connection (through the internet for example) with a server 302. As such, a "mobile" network connection is established between the navigation device 200 (which can be, and often times is mobile as it travels alone and/or in a vehicle) and the server 302 to provide a "real-time" or at least very "up to date" gateway for information.

The establishing of the network connection between the mobile device (via a service provider) and another device such as the server 302, using an internet (such as the World Wide Web) for example, can be done in a known manner. This can include use of TCP/IP layered protocol for example. The mobile device can utilize any number of communication standards such as CDMA, GSM, WAN, etc.

As such, an internet connection may be utilised which is achieved via data connection, via a mobile phone or mobile phone technology within the navigation device 200 for example. For this connection, an internet connection between the server 302 and the navigation device 200 is established. This can be done, for example, through a mobile phone or other mobile device and a GPRS (General Packet Radio Service)-connection (GPRS connection is a high-speed data connection for mobile devices provided by telecom operators; GPRS is a method to connect to the internet).

The navigation device 200 can further complete a data connection with the mobile device, and eventually with the internet and server 302, via existing Bluetooth technology for example, in a known manner, wherein the data protocol can utilize any number of standards, such as the GSRM, the Data Protocol Standard for the GSM standard, for example.

The navigation device 200 may include its own mobile phone technology within the navigation device 200 itself (including an antenna for example, or optionally using the internal antenna of the navigation device 200). The mobile phone technology within the navigation device 200 can include internal components as specified above, and/or can include an insertable card (e.g. Subscriber Identity Module or SIM card), complete with necessary mobile phone technology and/or an antenna for example. As such, mobile phone technology within the navigation device 200 can similarly establish a network connection between the navigation device 200 and the server 302, via the internet for example, in a manner similar to that of any mobile device.

For GRPS phone settings, a Bluetooth enabled navigation device may be used to correctly work with the ever changing spectrum of mobile phone models, manufacturers, etc., model/manufacturer specific settings may be stored on the navigation device 200 for example. The data stored for this information can be updated.

In FIG. 3 the navigation device 200 is depicted as being in communication with the server 302 via a generic communications channel 318 that can be implemented by any of a number of different arrangements. The server 302 and a navigation device 200 can communicate when a connection via communications channel 318 is established between the server 302 and the navigation device 200 (noting that such a connection can be a data connection via mobile device, a direct connection via personal computer via the internet, etc.).

The server 302 includes, in addition to other components which may not be illustrated, a processor 304 operatively connected to a memory 306 and further operatively connected, via a wired or wireless connection 314, to a mass data storage device 312. The processor 304 is further operatively connected to transmitter 308 and receiver 310, to transmit and send information to and from navigation device 200 via communications channel 318. The signals sent and received may include data, communication, and/or other propagated signals. The transmitter 308 and receiver 310 may be selected or designed according to the communications requirement and communication technology used in the communication design for the navigation system 200. Further, it should be noted that the functions of transmitter 308 and receiver 310 may be combined into a signal transceiver.

Server 302 is further connected to (or includes) a mass storage device 312, noting that the mass storage device 312 may be coupled to the server 302 via communication link 314. The mass storage device 312 contains a store of navigation data and map information, and can again be a separate device from the server 302 or can be incorporated into the server 302.

The navigation device 200 is adapted to communicate with the server 302 through communications channel 318, and includes processor, memory, etc. as previously described with regard to FIG. 2, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver.

Software stored in server memory 306 provides instructions for the processor 304 and allows the server 302 to provide services to the navigation device 200. One service provided by the server 302 involves processing requests from the navigation device 200 and transmitting navigation data from the mass data storage 312 to the navigation device 200. Another service provided by the server 302 includes processing the navigation data using various algorithms for a desired application and sending the results of these calculations to the navigation device 200.

The communication channel 318 generically represents the propagating medium or path that connects the navigation device 200 and the server 302. Both the server 302 and navigation device 200 include a transmitter for transmitting data through the communication channel and a receiver for receiving data that has been transmitted through the communication channel.

The communication channel 318 is not limited to a particular communication technology. Additionally, the communication channel 318 is not limited to a single communication technology; that is, the channel 318 may include several communication links that use a variety of technology. For example, the communication channel 318 can be adapted to provide a path for electrical, optical, and/or electromagnetic communications, etc. As such, the communication channel 318 includes, but is not limited to, one or a combination of the following: electric circuits, electrical conductors such as wires and coaxial cables, fibre optic cables, converters, radio-frequency (RF) waves, the atmosphere, empty space, etc. Furthermore, the communication channel 318 can include intermediate devices such as routers, repeaters, buffers, transmitters, and receivers, for example.

In one illustrative arrangement, the communication channel 318 includes telephone and computer networks. Furthermore, the communication channel 318 may be capable of accommodating wireless communication such as radio frequency, microwave frequency, infrared communication, etc. Additionally, the communication channel 318 can accommodate satellite communication.

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 318. These signals may be modulated, encrypted and/or compressed signals as may be desirable for the communication technology.

The server 302 includes a remote server accessible by the navigation device 200 via a wireless channel. The server 302 may include a network server located on a local area network (LAN), wide area network (WAN), virtual private network (VPN), etc.

The server 302 may include a personal computer such as a desktop or laptop computer, and the communication channel 318 may be a cable connected between the personal computer and the navigation device 200. Alternatively, a personal computer may be connected between the navigation device 200 and the server 302 to establish an internet connection between the server 302 and the navigation device 200. Alternatively, a mobile telephone or other handheld device may establish a wireless connection to the internet, for connecting the navigation device 200 to the server 302 via the internet.

The navigation device 200 may be provided with information from the server 302 via information downloads which may be periodically updated automatically or upon a user connecting navigation device 200 to the server 302 and/or may be more dynamic upon a more constant or frequent connection being made between the server 302 and navigation device 200 via a wireless mobile connection device and TCP/IP connection for example. For many dynamic calculations, the processor 304 in the server 302 may be used to handle the bulk of the processing needs, however, processor 210 of navigation device 200 can also handle much processing and calculation, oftentimes independent of a connection to a server 302.

As indicated above in FIG. 2, a navigation device 200 includes a processor 210, an input device 220, and a display screen 240. The input device 220 and display screen 240 are integrated into an integrated input and display device to enable both input of information (via direct input, menu selection, etc.) and display of information through a touch panel screen, for example. Such a screen may be a touch input LCD screen, for example, as is well known to those of ordinary skill in the art. Further, the navigation device 200 can also include any additional input device 220 and/or any additional output device 241, such as audio input/output devices for example.

Figure 4A:
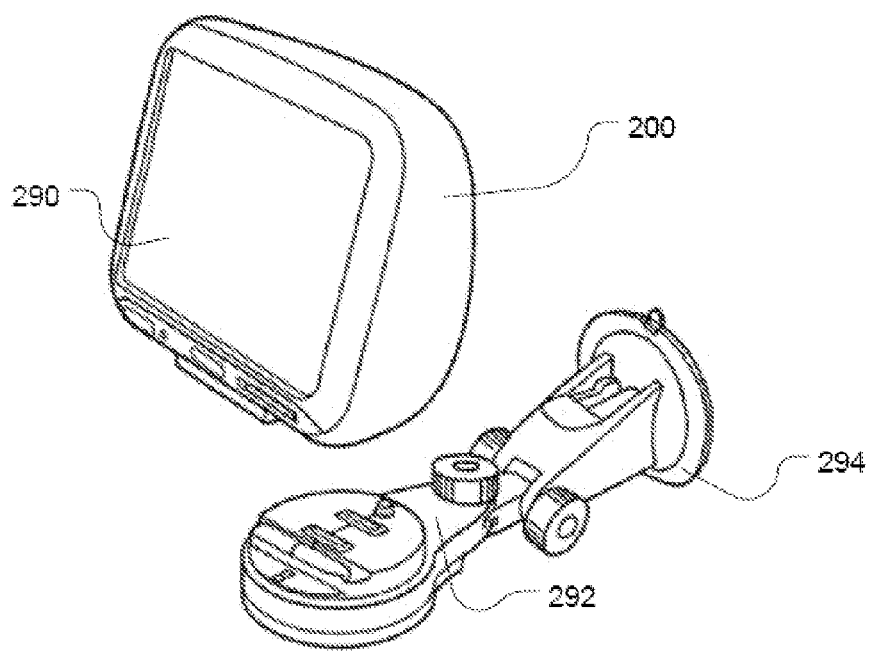
FIGS. 4A and 4B are illustrative perspective views of a navigation device.
Figure 4B:
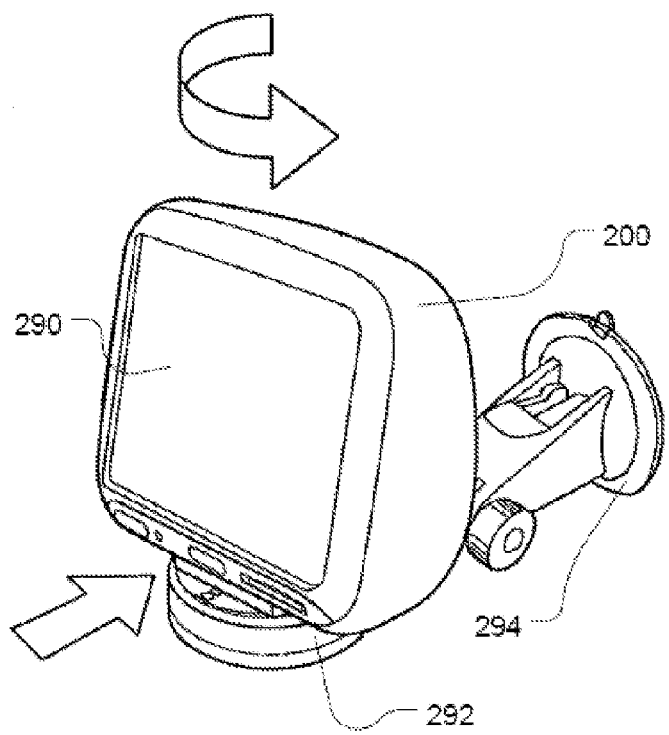

FIGS. 4A and 4B are perspective views of a navigation device 200. As shown in FIG. 4A, the navigation device 200 may be a unit that includes an integrated input and display device 290 (a touch panel screen for example) and the other components of FIG. 2 (including but not limited to internal GPS receiver 250, microprocessor 210, a power supply, memory systems 230, etc.).

The navigation device 200 may sit on an arm 292, which itself may be secured to a vehicle dashboard/window/etc. using a suction cup 294. This arm 292 is one example of a docking station to which the navigation device 200 can be docked.

As shown in FIG. 4B, the navigation device 200 can be docked or otherwise connected to an arm 292 of the docking station by snap connecting the navigation device 292 to the arm 292 for example. The navigation device 200 may then be rotatable on the arm 292, as shown by the arrow of FIG. 4B. To release the connection between the navigation device 200 and the docking station, a button on the navigation device 200 may be pressed, for example. Other equally suitable arrangements for coupling and decoupling the navigation device to a docking station are well known to persons of ordinary skill in the art.

Figure 5:
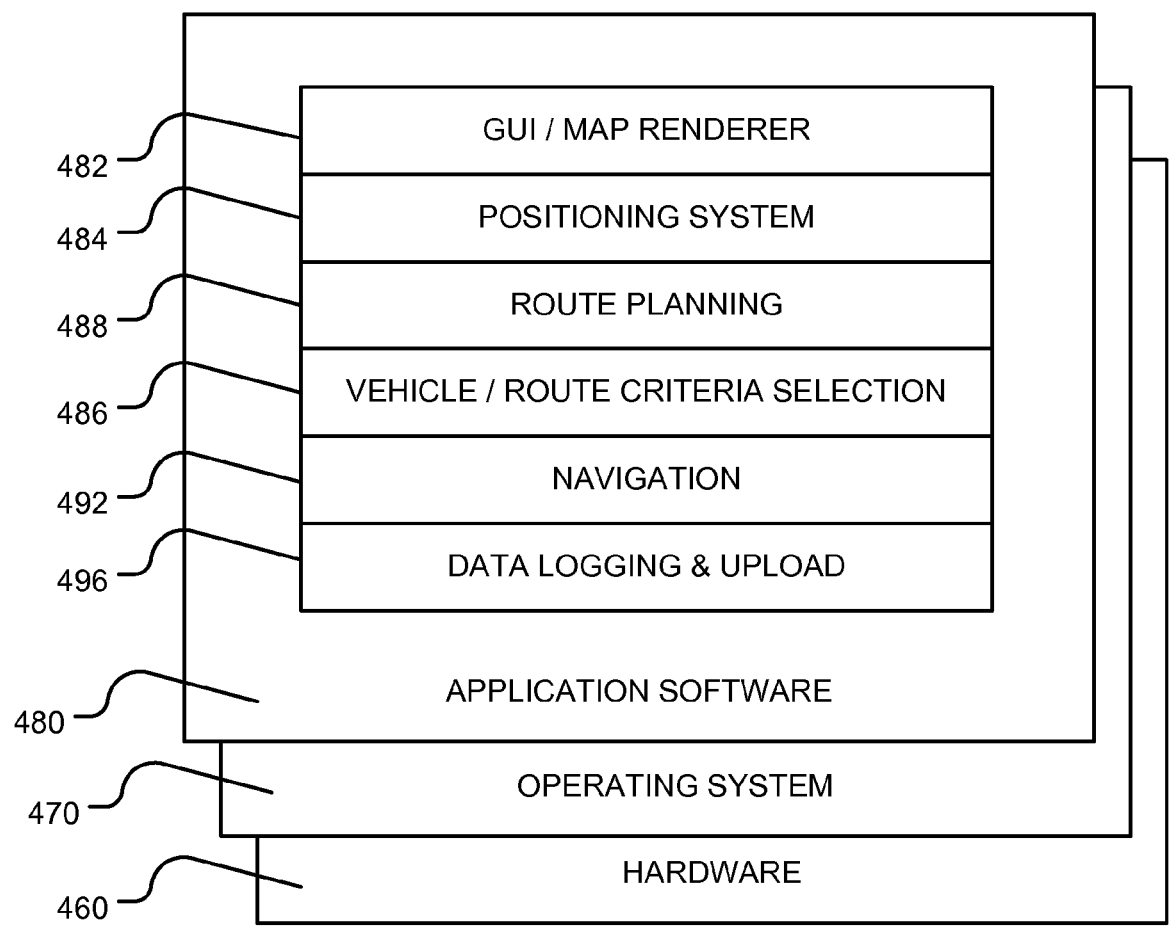
FIG. 5 is a schematic representation of software/hardware hierarchy in the navigation device.
Figure 6:
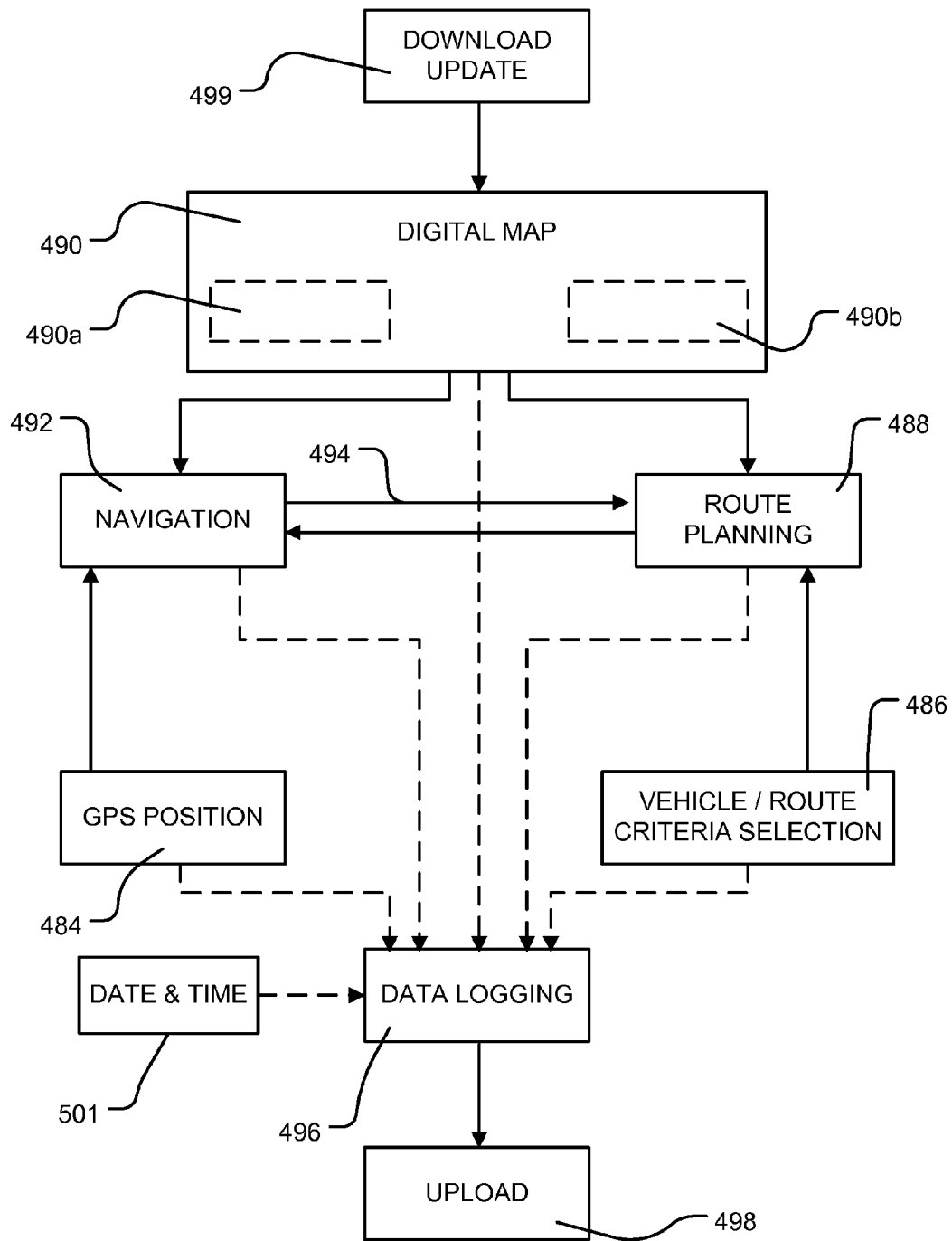
FIG. 6 is a schematic representation of information flow between, and processing by, software modules.

Referring now to FIGS. 5 and 6 of the accompanying drawings, the memory resource 230 stores a boot loader program (not shown) that is executed by the processor 210 in order to load an operating system 470 from the memory resource 230 for execution by functional hardware components 460, and which provides an environment in which application software 480 can run. The operating system 470 serves to control the functional hardware components 460 and resides between the application software 480 and the functional hardware components 460. The operating system 470 may provide universal services for the application software, for example, including maintaining current time and date information. The application software 480 provides an operational environment implementing core functions of the navigation device 200, for example map viewing, route planning, navigation functions and any other functions associated therewith.

The memory resource 230 also stores a digital map 490 used by the application software 480 to generate map views, and to calculate navigation routes. The digital map 490 includes information defining roads, built-up areas, terrain type, elevation, etc. The digital map 490 may include several different information components, including road information 490a (for example, identifying the positions of roads and junctions) and supplementary road information 490b for the road, such as goods-vehicle-specific information for the road. Goods-vehicle-specific information may characterise the suitability of the road for goods-vehicle use. Various characteristics may be used, such as designations of one or more of: goods-vehicle-restricted, goods-vehicle-wary, goods-vehicle-neutral, goods-vehicle-common, goods-vehicle-preferred. Goods-vehicle-restricted refers to official restrictions (e.g. according to government information or to road signs) restricting allowed goods-vehicle use, such as one or more of: weight limit, width limit, length limit, height limit, speed limit, restriction on carriage of hazardous materials, restriction on goods-vehicle use at certain times of day, and restrictions on vehicles incapable of sharp turns. Goods-vehicle-preferred refers to a road being indicated officially as a goods-vehicle-friendly route (e.g. according to government information or road-signs). The other designations refer not to goods-vehicle information from official sources, but instead to expert system information generated in accordance with the principles of the present invention. Goods-vehicle-common means that a road is frequently used by goods-vehicles. Goods-vehicle-wary means that a road might not be suitable for goods-vehicles, even though there are no official restrictions. Goods-vehicle-neutral means that there is no information for or against a goods-vehicle using the road.

Although the above designations are listed separately, it is possible to combine designations together if it is not necessary to distinguish between designations for the purposes of route planning. For example, the designations of goods-vehicle-preferred and goods-vehicle-common may be combined into a single goods-vehicle-suitable designation, meaning that the road is considered to be suitable for goods-vehicles (either because the road is officially recognised as such, or because it is generally used by goods-vehicles). The designation of goods-vehicle-wary may also be combined into the goods-vehicle-restricted designation. Using multiple designations enables a wider degree of choice in route planning preferences (as described later). However, if it is not necessary to provide such choice (e.g. in order to simplify device operation by reducing the choices a user has to make), then combining designations may streamline operation and reduce the data size of the supplementary road information 490b.

It is also possible to increase the number of designations, in order to provide greater finesse of route calculation, or to provide greater user choice for route planning preferences. For example, the above designations may be split into different size and/or weight groups, to provide independent information for medium sized goods-vehicles, or larger goods-vehicles. For example, a road may be designated as goods-vehicle-restricted for large goods-vehicles, but nevertheless goods-vehicle-common for goods-vehicles up to medium size. Various alternatives may used for relative scoring of each designation.

Figure 10:
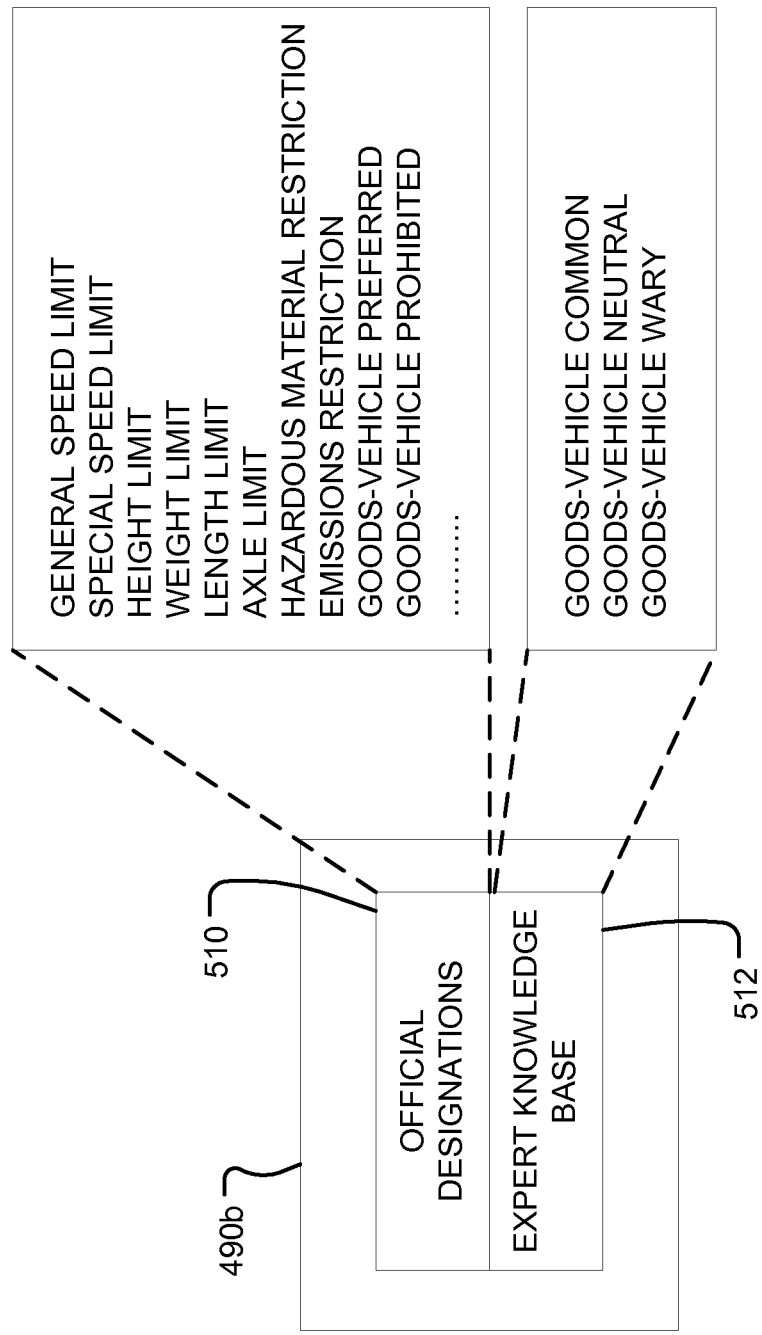
FIG. 10 is a schematic illustration of an information format for supplementary road information in a digital map.

FIG. 10 illustrates one example of a format for the supplementary road information 490b. The information may be organised or compartmentalised directly using the format, or it may just be organisable or identifiable using this format. For example, the information fields may be identified by tags or labels, although organised in a different way. Not all of the fields need be used for every road. Typically, only necessary fields for road information would be used. The supplementary road information 490b for a road may include official designation information 510 and expert-knowledge-base information 512. Official designation information 510 includes information from government sources or road signs, for example, a speed limit, a special speed limit, a height limit, a weight limit, a length limit, axle limit, hazardous material restriction, an emissions restriction, a goods-vehicle-preferred designation, a goods-vehicle restricted designation. Expert-knowledge-base information 512 includes information not originating from official sources, but instead from analysis of road use. In the context of the present invention, the expert-knowledge-base information 512 includes at least suitability of the road for use according to vehicle category, based on a statistical analysis of a history of road usage by vehicle category. For example, the suitability may be indicated for goods vehicles by: good-vehicle-common, goods-vehicle-neutral, or goods-vehicle-wary. Similar designations may be used for each vehicle category of interest.

The application software 480 may include one or more software modules as described below. Although the modules are represented separately, it will be appreciated that this is merely for the sake of explanation. Functionality may overlap between modules, and/or one module may comprise another, and/or more modules may be provided. The modules may include one or more of:

- a graphical user interface (GUI) module 482 that supports other modules by providing a unified input/output interface, and provides an image renderer for map views;
- a positioning system (e.g. GPS) module 484 for implementing real-time position determination to generate current position information, optionally interfacing with external positioning system hardware as described hereinbefore;
- a vehicle/route criteria module 486 for inputting and/or storing information concerning the type of vehicle, a start location, a destination location and optionally one or more waypoints for a navigation route, and the type of navigation route desired;
- a route planning module 488, responsive to information contained in a digital map 490 and to information from the vehicle/route criteria module 486, for calculating a navigation route from the start location to the destination location. The digital map 490 is also stored by the memory resource 230.
- a navigation module 492, responsive to (i) the current position information from the positioning system module 482, (ii) the digital map 490, and (iii) the calculated route from the route planning module 488; for implementing real-time navigation guidance for guiding a vehicle driver to navigate along the calculated route. The navigation module 492 may generate audio and/or visual guidance prompts to aid navigation step-by-step. In the event that the navigation module 492 determines, from the current position information, that the vehicle has deviated substantially from the calculated route, the navigation module 492 may issue a re-route command 494 to the route planning module 488, to calculate a new route taking account of the vehicle's current position;
- a data logging module 496 for logging trip information. The trip information may include information from one or more of: the positioning system 484, route planning module 488, navigation module 492, vehicle/route criteria module 486, and the digital map 490 (useful if the position information is coded with respect to information from the digital map). In FIG. 6 information flow for the purposes of data logging is indicated by broken lines.

Figure 7:
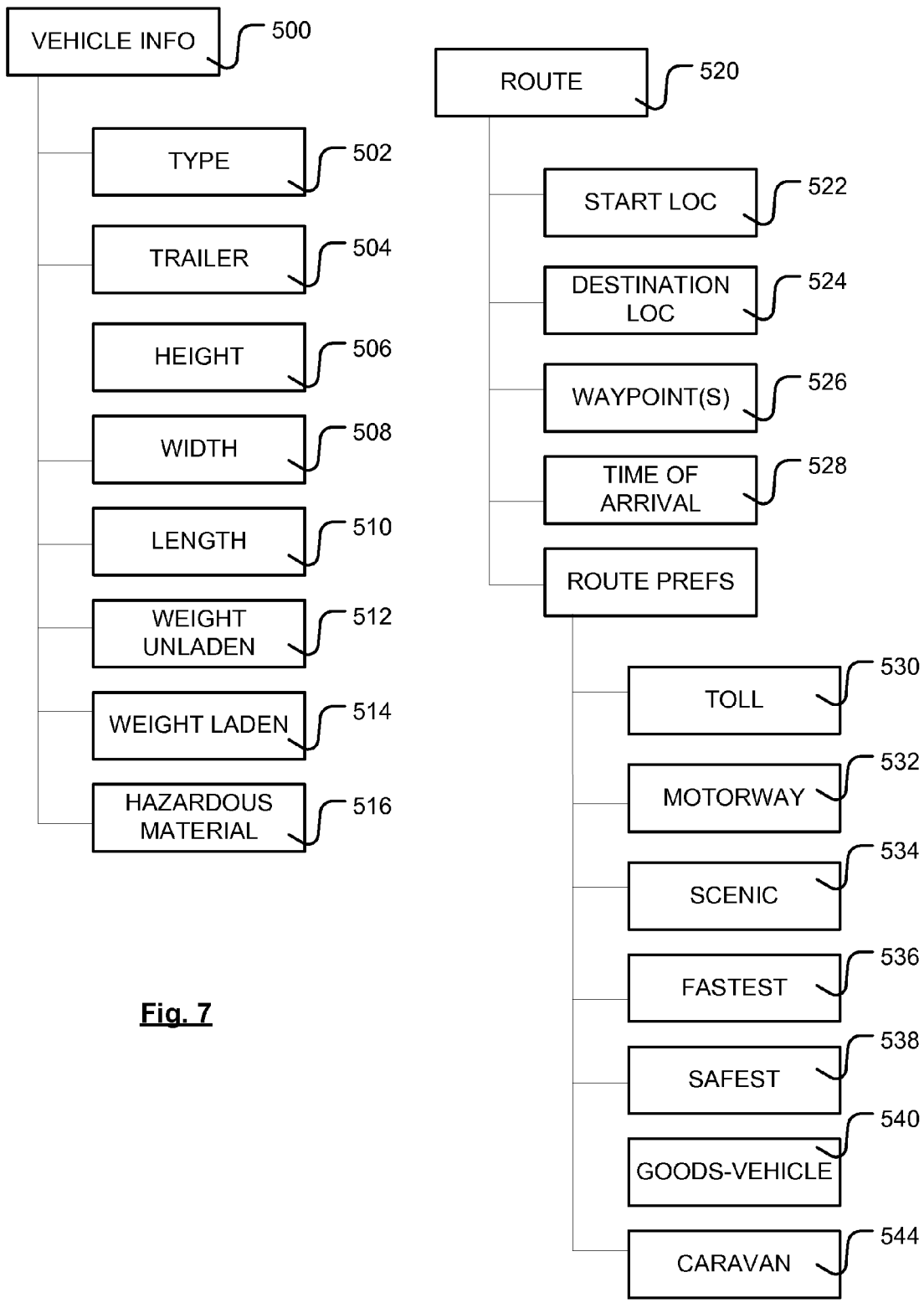
FIG. 7 is a schematic representation of characteristics from the vehicle/route criteria selection module.

FIG. 7 illustrates one example of information that is input and/or stored by the vehicle/route criteria module 486. Vehicle information 500 is intended to identify a category of vehicle. The collection or set of vehicle parameters may be referred to as a vehicle profile. The vehicle information 500 may include the vehicle type or category 502 (for example, selected from a predetermined list of car, goods-vehicle, bus, etc.), trailer information 504 (such as car+caravan, or articulated lorry trailer). For vehicles larger than standard cars, the vehicle information may additionally include vehicle height 506, vehicle width 508, vehicle length 510, vehicle weight unladen 512, optionally vehicle weight laden 514 for goods-vehicles, hazardous material contents 516 for goods-vehicles. Various other vehicle parameters may also be stored, and/or one or more of the above parameters may be omitted as desired. The information may be freely inputtable as discrete values by a user, or selected from predetermined value ranges (such as for weight (in metric tonnes), ranges of 1-5, 5-10, 10-15, 15-20, etc.). Some of the information may also be determined inherently from other information. For example, if a goods-vehicle is identified by a goods-vehicle classification type or by a vehicle model identifier, then one or more of the parameters may be inferred from such information without requiring separate input. When the navigation device is implemented as a PND, the vehicle/route criteria module 486 preferably includes an interface for enabling the user to set or adjust vehicle information values. Additionally or alternatively, values may be set by software executed on a user's home computer when connected to the PND. When the navigation device is implemented as in-vehicle equipment that is permanently installed in a single vehicle instead of as a PND, at least some of the vehicle parameters may be pre-set at manufacture or installation. The vehicle/route criteria module 486 may optionally be configured to obtain the vehicle information from an in-vehicle identification unit (not shown). The navigation unit 200 may establish a communication connection with the in-vehicle identification unit by any suitable means, such as via wireless connection (e.g. Bluetooth) or a wired connection or wired bus, such as a Controller Area Network bus (CAN-bus), which is a bus protocol that is widely used in the automotive industry for implementing a distributed communications network between discrete in-vehicle devices.

The vehicle/route criteria module 486 further provides an interface for route information 520, including for example, a start location 522, a destination location 524, one or more intermediate waypoint locations 526, time of day (or desired time of arrival) 528, and route-type preferences typically indicated by flags indicating preferences according to their state (selected or deselected). Example flags include one or more of: toll-road use 530, motorway use 532, scenic-route use 534, fastest-route 536, safest-route 538, goods-vehicle-route 540, caravan-route 544. Additional preferences may also be provided, and/or one or more of the above preferences may be omitted, as desired. The preferences may be freely settable, and/or one or more preferences may be pre-set (either in a fixed manner, or an initial default manner) according to the vehicle information 500. For example, if the vehicle information indicates the vehicle to be a goods-vehicle, the goods-vehicle-route flag 540 may be pre-set to its selected state, and at least the scenic-route flag 536 may be pre-set to its deselected state. The preference flags are used by the route planning module 488 for determining an optimum route for the vehicle to follow that satisfies the preference criteria. For example, in the case of the goods-vehicle-route flag 540 being selected, the navigation route is calculated to optimise the route in accordance with the goods-vehicle-specific supplementary-road information 490b in the digital map 490. The navigation route avoids roads whose limits or restrictions would be exceeded by the goods-vehicle parameters, or where the road is designated as goods-vehicle-wary. Roads that are goods-vehicle-suitable (either goods-vehicle-preferred or goods-vehicle-common) are weighted more favourably for inclusion in the navigation route, or the navigation route may be calculated to use exclusively roads designated as goods-vehicle-suitable where possible. In one form, when vehicle characteristics such as weight and size are stored by the vehicle/route criteria module 486, the route planning module 488 always compares these values with supplementary road information 490b even if the goods-vehicle route flag is not in its selected state. The goods-vehicle route flag 540 is then used to select navigation on roads designated as goods-vehicle-suitable (goods-vehicle-preferred or goods-vehicle-common), and to avoid goods-vehicle-wary roads. In another form, the comparison of vehicle weight and size, with respect to supplementary road information, is only conducted by the route planning module 488 when the goods-vehicle-route flag 540 is in its selected state. One or more additional preference flags may be provided in order to provide sub-preferences for controlling separately which of the vehicle parameters for goods-vehicles are used in route planning. For example, separate preference flags may be provided for (i) vehicle parameters such as size and weight, and (ii) roads that are goods-vehicle-suitable. Additionally or alternatively, separate preference flags may be provided for distinguishing between roads that are (i) goods-vehicle-preferred, and (ii) goods-vehicle-common, if a distinction is made between such information in the supplementary road information 490b of the digital map 490.

In one form, the vehicle/route criteria module 486 may enable the criteria to be programmed differently for different portions of a journey. For example, a navigation route may be calculated for a goods-vehicle travelling laden from a departure point to a drop-off waypoint, and then returning unladen to its final destination (which may typically be the same as the departure point). In such case, the vehicle weight may change at the drop-off waypoint, allowing a different and perhaps shorter route to be used for the return portion of the journey. Alternatively, two different, independent journeys may be calculated with different vehicle parameters.

The data logging module 496 serves to log trip information, which may also be referred to as a trace of the determined position over time (sometimes called a "GPS trace"). Various techniques for logging, coding and/or compressing the information may be used. Techniques may include one or more selected from (i) position-sampling of the real time position of the vehicle, such that the position information is logged each time that displacement by a certain threshold is detected, (ii) time-sampling of the real-time position of the vehicle, such that the position information is logged at a set time interval, (iii) a combination of both position and time sampling, (iv) event-logging of significant events, such as changes in the vehicle parameters or route preferences, or deviation from a navigation route, re-calculation of the navigation route, advancement along the navigation route, or arrival at a junction, or arrival at a waypoint or destination. The trip information may be recorded as one or more of: real-position co-ordinates (e.g. GPS co-ordinates); co-ordinates with respect to the digital map; a position on a road depicted in the map; a position along a planned navigation route. The logged data may optionally include time and/or date stamp information obtained from the current time and date function provided by the operating system 470. It will be appreciated that such information may be represented in any desired format. For example, the date may be represented by a annual calendar date, or a day of the month, or a day of the week. The logged data may further include information identifying or defining the planned navigation route. The logged data is intended to facilitate simulation or re-construction of the movements of the navigation device or vehicle, to permit journey analysis.

The data logging module 496 also serves to upload the logged data to the server 150 (step 498) when a connection is available. If the connection is via a wireless path (or via a permanent or so-called generally-present path), a connection may be established periodically, either automatically or at the request of the data logging module 496. If the connection is via a wired path, e.g. using a user's fixed computer (such as for a PND), the connection may be established whenever the user couples the navigation device 200 to the home computer. The data uploaded to the server 150 includes the trip information, and vehicle information based on the vehicle parameters. The vehicle information may be stored as part of the logged data, or it may be read from the vehicle/route criteria module 486 at the time of upload. Storing the vehicle information as part of the logged data enables any changes to the vehicle information to be recorded in time sequence with the trip information for the vehicle. This may be significant for a PND which might be used with different vehicles, or for a goods-vehicle making trips laden or unladen, or with different laden weights.

Figure 8:
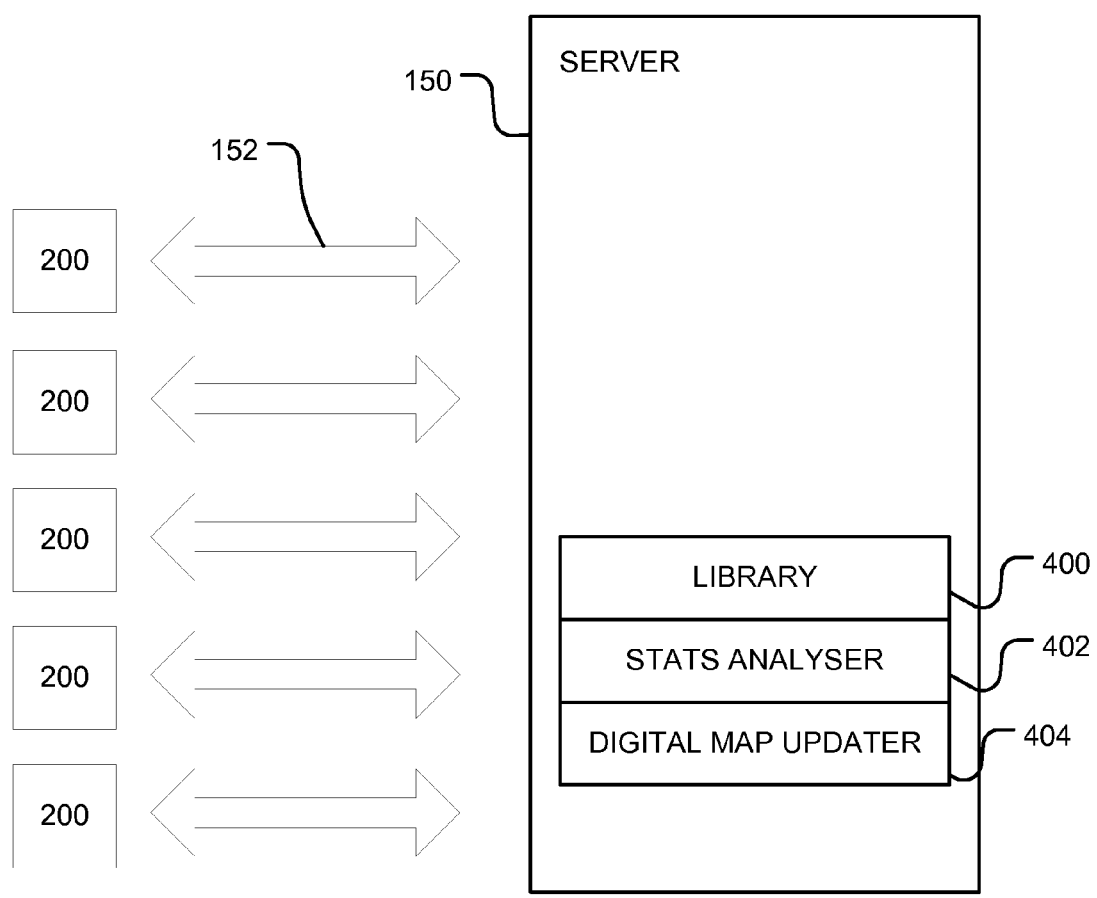
FIG. 8 is a schematic representation of information exchange with a server, and server-side processing of the information.

Referring to FIG. 8, the server 150 receives trip information uploaded from plural navigation devices 200, stores this in an upload library 400, and executes a statistical analyzer 402 to process the trip information to derive statistical analyses. While the trip information for an individual journey may be influenced by unique journey events, analysing trip information from multiple devices enables driver habit, journey time patterns and route patterns to be derived statistically. The statistical analyzer 402 is programmed to recognise certain characteristics indicative of information desired to be derived.

Figure 9:
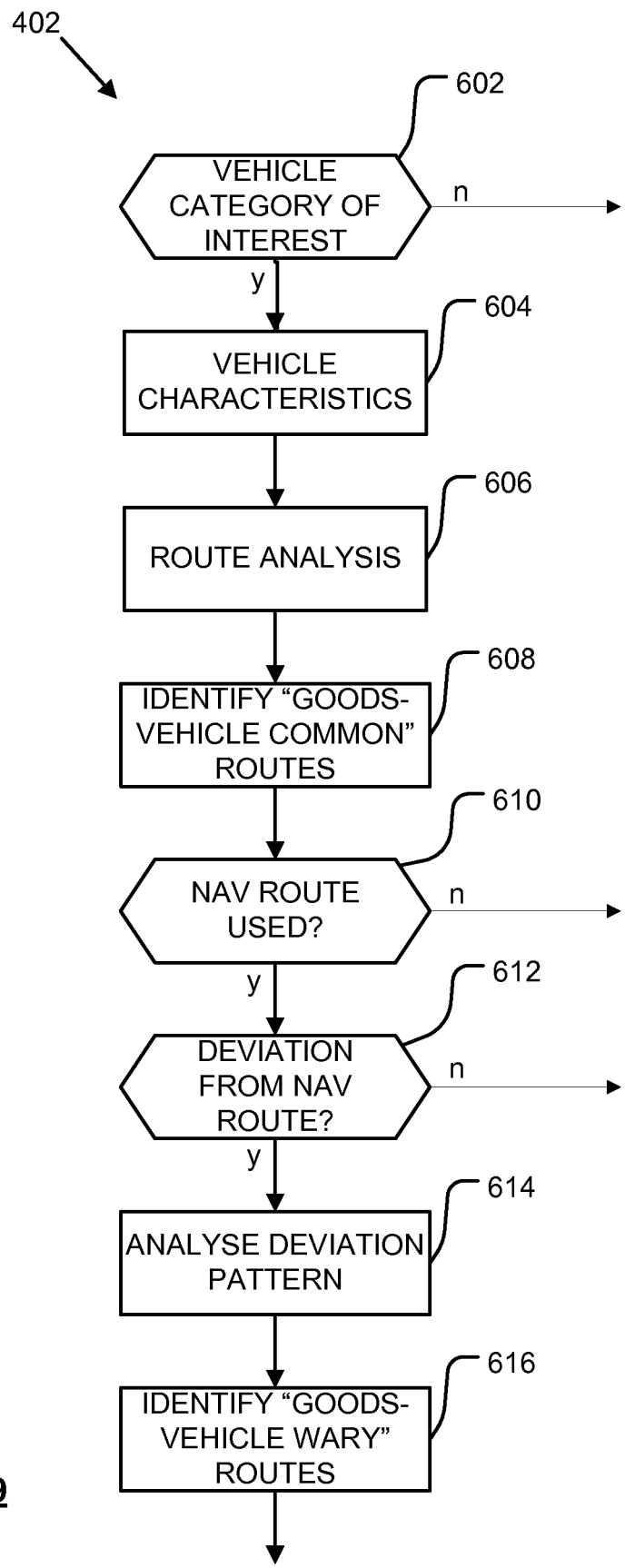
FIG. 9 is a schematic flow diagram illustrating statistical analysis operation at the server for identifying route patterns according to vehicle category.

Referring to FIG. 9, in the preferred embodiment, the statistical analyzer 402 is configured to derive information regarding the route patterns taken by vehicles according to their vehicle parameters or category, especially large vehicles such as goods-vehicles and buses, or by articulated vehicles, such as car+caravan combinations. At a first step 602, the vehicle type from the logged information is compared to identify one of the above category of vehicle of interest, for example, a goods-vehicle. If the vehicle is of a category of interest, the vehicle characteristics are derived at step 604. At step 606, the route taken by the vehicle is analyzed, and compared statistically with other routes used by goods-vehicles. The statistical comparison may be performed using any suitable technique. For example, the route may be divided into segments, which may correspond to individual roads or road portions between junctions or significant junctions if preferred. At step 608, roads determined to be used commonly by goods-vehicles are designated as "goods-vehicle-common". At step 610, a determination is made of whether the goods-vehicle was following a planned route and, if so, step 612 determines whether the goods-vehicle deviated from the route. In case of deviation, step 614 performs a statistical analysis to determine whether the deviation follows a pattern of other deviations from planned routes made by goods-vehicles. While, a goods-vehicle may deviate from a planned route of an individual journey for any of a number of reasons, if a statistical analysis reveals a trend of goods-vehicles tending to avoid a certain road or junction or turn for no apparent reason (such as known roadworks or temporary deviation in place for all goods-vehicles), this is indicative of the goods-vehicles finding the planned route awkward for some reason, or experienced goods-vehicle drivers using their own personal knowledge of a better route. If desired, verification of the effectiveness of the alternative route pattern may be confirmed by observing the speed profile of the vehicles from the logged trip information, and/or the journey times. At Step 616 roads or junctions around which deviations are routinely taken by goods-vehicles for no other known reason, are designated as "goods-vehicle-wary".

Figure 11:
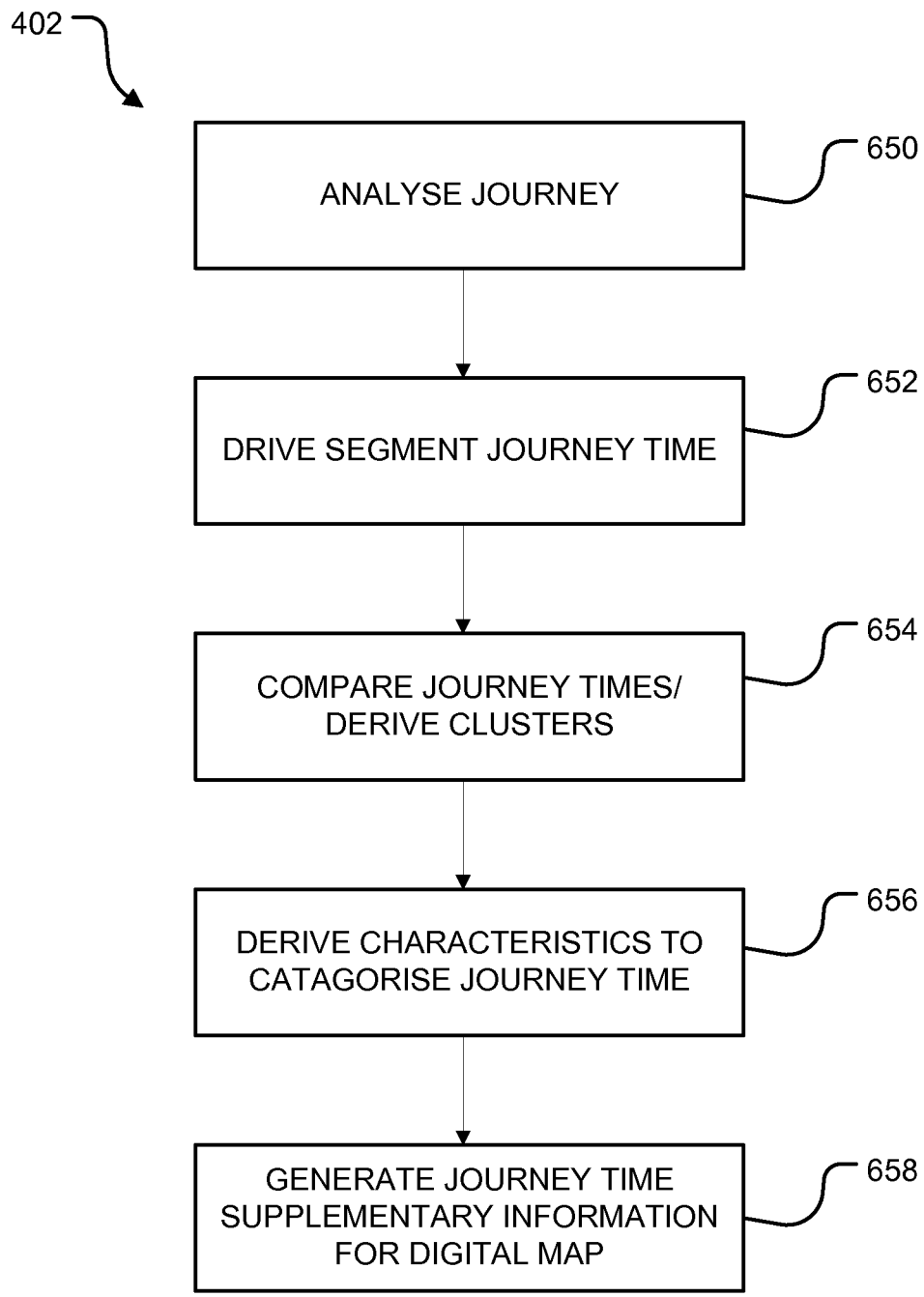
FIG. 11 is a schematic flow diagram illustrating statistical analysis operation at the server for identifying journey time information according to vehicle category.

Additionally or alternatively, referring to FIG. 11, the statistical analyzer 402 may be configured to derive information concerning journey time patterns according to vehicle category. At step 650, the route taken by a vehicle is analyzed, and divided into segments, which may correspond to individual roads or road portions between junctions or significant junctions if preferred. At step 652, the journey time along each segment is determined according to the logged date-time information. At step 654, the journey time is compared statistically with other journey times derived historically. For example, clusters of journey times may be derived. At step 656, the journey time (or a cluster grouping) is analysed to determine respective characteristics, or unifying characteristics in the cause of a cluster grouping. One of the (unifying) characteristics may be the vehicle category. For example, cars may generally travel along a route more quickly than goods vehicles. This may be apparent in town centres where cars are able to manoeuvre, accelerate and decelerate more quickly than goods vehicles. On motorways, goods vehicles may have to observe a lower speed limit than cars. Another (unifying) characteristic may be the type of day (for example, a schoolday, or a working day, or a non-working day), and/or the time of day (for example, whether at time of habitually peak-traffic, or a time of habitually calmer traffic). At step 658, supplementary information is generated to provide an indication of journey time for a road or road segment, based on the historical pattern of journey times, and with a respective journey time according to the different characteristics such as vehicle category, day type, and time of day.

Returning to FIG. 8, following processing by the statistical analyzer 402, processing proceeds to a digital map updater 404 for updating the working version of the digital map at the server 150. Updates from the digital map will then be available for download to each navigation device 200 served by the server 150, upon a subsequent connection by each navigation device 200. The download updating step is indicated at 499 in FIG. 6. Thus navigation devices 200 are able to collect, and subsequently be supplied with, updated and refined goods-vehicle-specific information.

The preferred embodiment therefore permits collection of an extremely valuable source of expert knowledge for large or special vehicles, such as goods-vehicles, buses and car+caravan combinations. Such information can refine navigation route planning for such categories of vehicles, enabling inexperienced drivers or drivers having to navigate vehicles through unfamiliar areas, to benefit from expert knowledge of others. Such information is impossible to collect using existing map-making techniques, and cannot be distilled from conventional sources such as official government designations of roads and road sign analysis. Moreover, the technique of the invention does not require additional map-making hardware, yet enables information to be collected easily and thoroughly in a highly automated and cost-effective manner.

It will also be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

For example, whilst embodiments described in the foregoing detailed description refer to GPS, it should be noted that the navigation device may utilise any kind of position sensing technology as an alternative to (or indeed in addition to) GPS. For example the navigation device may utilise using other global navigation satellite systems such as the European Galileo system. Equally, it is not limited to satellite based but could readily function using ground based beacons or any other kind of system that enables the device to determine its geographic location.

Additionally, the enhanced content of a digital map may be used by other devices, such as navigation servers, that might not themselves log trip data. For example, several internet web-sites offer the possibility of route planning from a start location to a destination location, according to user-selectable criteria. The results may be downloaded or printed for later use. By providing enhanced supplementary information in a digital map, such users may also benefit from enhanced goods-vehicle-specific information. The invention extends to cover such use without logging of new trip data.

It will also be well understood by persons of ordinary skill in the art that whilst the preferred embodiment implements certain functionality by means of software, that functionality could equally be implemented solely in hardware (for example by means of one or more ASICs (application specific integrated circuit)) or indeed by a mix of hardware and software. As such, the scope of the present invention should not be interpreted as being limited only to being implemented in software.

Lastly, it should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

The invention claimed is:

1. An apparatus for generating supplementary information for a digital map, the supplementary information representing suitability of road use according to vehicle category, the apparatus comprising:
   a receiver, the receiver being operative to receive trip information representing sessions of logged journeys from a plurality of navigation devices, each session of a logged journey including vehicle category information in respect of a vehicle making the logged journey, a memory; and
   a processor, the processor being operative to: analyse the vehicle category information to identify at least one session corresponding to a vehicle category of interest, the vehicle category of interest including at least one selected from: a goods-vehicle; a bus; a car+caravan combination; a vehicle exceeding a predetermined weight threshold; a vehicle exceeding a predetermined width threshold; a vehicle exceeding a predetermined height threshold; a vehicle exceeding a predetermined length threshold; and a vehicle carrying predetermined hazardous material;
   analyse the trip information corresponding to at least one vehicle category of interest, to identify a route or route portion used by the vehicle on its journey;
   analyse plural routes or route portions from a plurality of sessions to identify statistically at least one trend of road use by vehicles of the vehicle category of interest, wherein the trend is a trend of vehicles of the category of interest having deviated from an expected route; and
   generate said supplementary information based on the at least one trend of road use by vehicles of the vehicle category of interest, the supplementary information representing suitability of road use according to vehicle category, wherein the generated supplementary information comprises information indicative of at least one road preferred by the users of the vehicles of the vehicle category of interest.

2. The apparatus of claim 1, wherein the processor is configured to designate, in response to detection of the trend for a road, the road as being suitable for use by vehicles of the vehicle category of interest.

3. The apparatus of claim 1, wherein the trend is established by use of the road by at least a predetermined number of vehicles of the category of interest, during a predetermined time interval.

4. The apparatus of claim 1, wherein the processor is configured to designate, in response to detection of the trend for a road, the road as being unsuitable for use by vehicles of the vehicle category of interest.

5. The apparatus of claim 1, wherein the trend is established by deviation by at least a predetermined number of vehicles of the category of interest, during a predetermined time interval.

6. The apparatus of claim 1, wherein the processor is further configured to combine said supplementary road information with information representing official designations of road suitability by vehicle category.

7. The apparatus of claim 1, wherein the processor is further configured to update digital map information with said supplementary information.

8. A method of generating, by an apparatus comprising a processor and an input device operatively connected thereto, supplementary information for a digital map, the supplementary information representing suitability of road use according to vehicle category, the method comprising:
   (a) receiving, by the processor from the input device, trip information representing sessions of logged journeys from a plurality of navigation devices, each session of logged journeys including vehicle category information in respect of a vehicle making the logged journey,
   (b) analyzing, by the processor, the vehicle category information to identify at least one session corresponding to a vehicle category of interest, the vehicle category of interest including at least one selected from: a goods-vehicle; a bus; a car+caravan combination; a vehicle exceeding a predetermined weight threshold; a vehicle exceeding a predetermined width threshold; a vehicle exceeding a predetermined height threshold; a vehicle exceeding a predetermined length threshold; and a vehicle carrying predetermined hazardous material;
   (c) analyzing, by the processor, the trip information corresponding to at least one vehicle category of interest, to identify a route or route portion used by the vehicle on its journey;
   (d) analyzing, by the processor, plural routes or route portions from a plurality of sessions to identify statistically at least one trend of road use by vehicles of the vehicle category of interest, wherein the trend is a trend of vehicles of the category of interest having deviated from an expected route; and (e) generating, by the processor, said supplementary information based on the at least one trend of road use by vehicles of the vehicle category of interest, the supplementary information representing suitability of road use according to vehicle category, wherein the generated supplementary information comprises information indicative of at least one road preferred by the users of the vehicles of the vehicle category of interest.

9. The method of claim 8, wherein the generation step comprises designating, in response to detection of the trend for a road, the road as being suitable for use by vehicles of the vehicle category of interest.

10. The method of claim 8, wherein the generation step comprises designating, in response to detection of the trend for a road, the road as being unsuitable for use by vehicles of the vehicle category of interest.

11. A non-transitory computer program product, which when executed by a processor, causes the processor to implement a method comprising:

(a) receiving, by the processor, trip information representing sessions of logged journeys from a plurality of navigation devices, each session of logged journeys including vehicle category information in respect of a vehicle making the logged journey, (b) analysing, by the processor, the vehicle category information to identify at least one session corresponding to a vehicle category of interest, the vehicle category of interest including at least one selected from: a goods-vehicle; a bus; a car+caravan combination; a vehicle exceeding a predetermined weight threshold; a vehicle exceeding a predetermined width threshold; a vehicle exceeding a predetermined height threshold; a vehicle exceeding a predetermined length threshold; and a vehicle carrying predetermined hazardous material;

(c) analysing, by the processor, the trip information corresponding to at least one vehicle category of interest, to identify a route or route portion used by the vehicle on its journey;

(d) analysing, by the processor, plural routes or route portions from a plurality of sessions to identify statistically at least one trend of road use by vehicles of the vehicle category of interest, wherein the trend is a trend of vehicles of the category of interest having deviated from an expected route; and (e) generating, by the processor, supplementary information based on the at least one trend of road use by vehicles of the vehicle category of interest, the supplementary information representing suitability of road use according to vehicle category, wherein the generated supplementary information comprises information indicative of at least one road preferred by the users of the vehicles of the vehicle category of interest.

* * * * *